United States Patent
Roter et al.

(10) Patent No.: US 7,957,729 B2
(45) Date of Patent: Jun. 7, 2011

(54) COMMUNICATION SYSTEM AND METHOD FOR OPERATING SUCH A SYSTEM

(75) Inventors: Martin Roter, Gelsenkirchen (DE); Andreas Juraschek, Haltern (DE); Andreas Freyer, Dortmund (DE); Thomas Roes, Bottrop (DE); Jens Jakobsen, Bochum (DE); Uwe Pertz, Bergheim (DE); Steven Rowland, Bochum (DE); Miska Hiltunen, Witten (DE); Ilpo Helminen, Herne (DE)

(73) Assignee: Nokia Corporation, Espoo (FI)

( * ) Notice: Subject to any disclaimer, the term of this patent is extended or adjusted under 35 U.S.C. 154(b) by 1484 days.

(21) Appl. No.: 10/540,441

(22) PCT Filed: Dec. 20, 2002

(86) PCT No.: PCT/IB02/05553
§ 371 (c)(1),
(2), (4) Date: Feb. 27, 2006

(87) PCT Pub. No.: WO2004/057891
PCT Pub. Date: Jul. 8, 2004

(65) Prior Publication Data
US 2006/0154659 A1 Jul. 13, 2006

(51) Int. Cl.
*H04Q 7/20* (2006.01)
(52) U.S. Cl. .................... 455/422.1; 455/424
(58) Field of Classification Search .................. None
See application file for complete search history.

(56) References Cited

U.S. PATENT DOCUMENTS

| | | | |
|---|---|---|---|
| 5,524,276 A * | 6/1996 | Littig et al. | 455/418 |
| 5,659,594 A | 8/1997 | Toda | |
| 2002/0099772 A1 * | 7/2002 | Deshpande et al. | 709/204 |
| 2002/0194299 A1 * | 12/2002 | Yasaki et al. | 709/217 |

FOREIGN PATENT DOCUMENTS

| | | |
|---|---|---|
| EP | 0 378 450 | 7/1990 |
| EP | 0 406 985 | 1/1991 |
| GB | 2 365 699 | 2/2002 |
| GB | 101 00 824 | 7/2002 |
| WO | 02/21867 | 3/2002 |
| WO | 02/23933 | 3/2002 |

OTHER PUBLICATIONS

European Office Action dated Dec. 8, 2010 in corresponding EP Application No. 02 788 406.3 (5 pages).

* cited by examiner

*Primary Examiner* — Phuoc Doan

(57) ABSTRACT

The present invention relates to communication system comprising first and second communication devices (11,12) each capable of communicating with a telecommunications network (10), and both being connectable to each other by a data link (17) for information transfer and to a method for operating the same. The first communication device (11) contains individual information, and the second communication device (12) comprises a special memory area (21) for storing individual information acquired from the first communication device (11). To enable an improved and facilitated usage of the system comparator means (22) for comparing the individual information contained in the first communication device (11) with that stored in the special memory area (21) of the second communication (12) device are provided. Therefore, only changes of the individual information of the first communication device (11) are stored in the second communication device (12) after comparing the individual information from the first communication device (11) stored in the second communication device (12) with the individual information in the first communication device (11) when the first communication device (11) is connected again to the second communication device (12).

15 Claims, 1 Drawing Sheet

COMMUNICATION SYSTEM AND METHOD FOR OPERATING SUCH A SYSTEM

CROSS REFERENCE TO RELATED APPLICATION

This patent application is the U.S. National Stage of International Application No. PCT/IB2002/00553 filed Dec. 20, 2002 and published in English on Jul. 8, 2004 under International Publication Number WO 2004/057891 A1.

BACKGROUND OF THE INVENTION

1. Technical Field

The present invention relates to a communication system comprising first and second communication devices each capable of communicating with a telecommunications network, and both being connectable to each other by a data link for information transfer as well as to a method for operating such a system.

2. Discussion of Related Art

WO 02/089449 A2 discloses a radiotelephone system including a first and a second radiotelephone, e.g. a mobile telephone and a car telephone, wherein the second radiotelephone if connected to the first radiotelephone can use SIM information and actual connection parameters of the first radiotelephone to establish a connection to a telecommunications network without going through the usual channel searching procedures etc. Therefore, a connection of the first radiotelephone to the telecommunications network can be switched over to the second radiotelephone.

Thus, a user of a telecommunications network who owns e.g. a mobile telephone and a car telephone can use his/her car telephone in his/her vehicle instead of his/her mobile telephone after switching over the connection, but can be contacted by anyone using the subscriber number of the mobile telephone.

A similar radio system is known from WO 02/21867 A2 which is concerned with the management of portable radiotelephones which are equipped with functionality to allow them to communicate with one another using a local wireless connection, such as low powered radio frequency (LPRF) link, a Bluetooth connection, or other communication means such as an infra-red link. Through the wireless link, the radiotelephone is able to acquire information from the SIM contained in another radiotelephone which is in the coverage range of the wireless link functionality to enable the one radiotelephone to function as if it had the SIM of the other radiotelephone inserted within itself. Thus, the radiotelephone that uses SIM information of another telephone is regarded as the other telephone in a telecommunications network so that all calls made to the other radio telephone will be received by that using the information of the other telephone. Additionally any calls made by the one radio telephone will be as if made by the other radiotelephone and will be billed accordingly. Furthermore, it has to be noted that the one radiotelephone may be used by more than one user each having her/his own (portable) radio telephone.

EP 0 406 985 B1 is concerned with a first mobile cellular radiotelephone and a second hand portable cellular radiotelephone that can be connected to the first radiotelephone via a fixed-wired electrical data link, an optical data link, or a radio data link.

When the two radiotelephones are connected with each other, the first one uses the subscriber number retrieved from a NAM (number assignment module that is comparable with a SIM (subscriber identification module)) of the second one whereas the R.F. circuits of the second one are switched off. According to a specific embodiment, information from the NAM of the second radiotelephone can be downloaded into a memory of the first one. A microprocessor of the first radiotelephone coupled to the NAM of the second radiotelephone or the memory uses NAM information of the second one so that the first radiotelephone assumes the identity of the second radiotelephone.

In addition, both radiotelephones may be provided with a RAM for variable data like abbreviated dialing codes, frequently dialed telephone numbers, or other data. In this case, variable data stored in the RAM of the second radiotelephone can be downloaded into that of the first one and can be used with the first one after the first radiotelephone assumed the identity of the second one.

Furthermore, the Bluetooth SIM Access Profile (SAP) enables one mobile radiotelephone to get wireless, remote access to a SIM card inserted in another radio telephone when both radio telephones are in a Bluetooth range of less than 10 meter. This feature is a specific Bluetooth profile that is standardized in the BT SIG (Bluetooth Special Interest Group), car working group.

The principal operation according to this specific Bluetooth profile is: a first mobile radiotelephone is registered with identification information from a local SIM card in a cellular network, i.e. a radio communications network.

When a second mobile radio telephone comes into a range of approximately less than 10 meters (Bluetooth range) both radio telephones can enter either automatically or by being manually triggered a so called remote SIM mode. In this mode the first radio telephone with the local SIM card leaves the wireless network while the second radiotelephone can access the SIM card of the first radiotelephone remotely via a Bluetooth wireless data link. In addition, the first radio telephone deactivates all functions that are related to wireless communication, i.e. deactivates the radio part thereof. Within this mode the second radiotelephone uses the SIM information acquired via the SIM access over Bluetooth to register with the same user identification in the cellular network. Finally the second radio telephone gets the active radiotelephone whereas the first radiotelephone remains passive as long as the remote SIM mode is active.

When the remote SIM mode is left both radio telephones go back to local mode, in which the first radio telephone is now active again.

If the first radiotelephone is a mobile telephone and the second is a car telephone there is a seamless "handover" from the mobile telephone radio part to the car telephone radio part when a user enters the car without using two different SIM cards. Since the mobile telephone gets active again when the remote SIM mode is left, there is a problem in case it is required to switch-off any radiotelephone, e.g. near at a patrol station, or other areas where explosive materials are handled, since a simple switch-off of the car telephone would not lead to switching-off all telephones because in this case both radio telephones would fall back to local mode, resulting in activating the mobile telephone again. Thus the mobile telephone would not have been switched-off simultaneously with the car telephone.

Another problem that might occur is a loss of received information if the active second radio telephone, e.g. a car telephone has less functionality than the first radiotelephone, e.g. a mobile telephone. The mobile telephone may be able to receive SMS, MMS, Calendar entries (vCal) and Business cards (vCard) and the like whereas the car telephone does not support such features. Therefore, received information according to these features may be lost.

Another problem occurs if a user of a first radio telephone who has to use the second radiotelephone instead of the first one wants to use his/her user specific data in the form of contact cards, telephone book entries, calendar information, voice text, notes, and the like stored his/her mobile telephone when he/she has to use the car embedded radio telephone.

SUMMARY OF THE INVENTION

It is an object of the present invention to provide a communication system and a method for operating the same, that enables an improved and facilitated usage of the system.

This object is achieved by the communication system and the methods described below. Refinements and developments of the present invention are described in detail.

According to the present invention the first communication device contains individual information, and the second communication device comprises a special memory area for storing individual information acquired from the first communication device as well as comparator means for comparing the individual information contained in the first communication device with that stored in the special memory area of the second communication device. As the data is copied from a mobile telephone to a special storage area in the car telephone, the data will not be mixed with the original data in the car telephone. Further, the user has access to the individual data of his/her telephone even if it is unreachable but wirelessly accessible.

To reduce the time needed for data transfer from the first to the second communication device upon connecting them again in case that the second communication device is to be used with different first communication devices, the special memory area comprises at least two separate portions for storing individual information of different first communication devices separately.

According to another aspect of the present invention a method for operating a communication system comprises the steps of:—storing individual information acquired from the first communication device in the second communication device so that the individual information from the first communication device is directly accessible by the second communication device when the first and the second communication devices are connected to each other by the data link at the very first time, or—comparing the individual information from the first communication device stored in the second communication device with the individual information in the first communication device when the first communication device is connected again to the second communication device, and—storing only changes of the individual information of the first communication device in the second communication device.

To ensure that information stored in the second communications device is prevented from unauthorized use, access to the individual information from the first communication device stored in the second communication device is prevented when the first and the second communication devices are disconnected.

According to a preferred embodiment of the present invention, the individual information from a first communication device stored in the second communication device is replaced by individual information from another first communication device when the another first communication device is connected first to the second communication device. This is especially useful in case the second communication device is mounted within a rental car with multiple customers. In this case it possible to keep the rental car related information permanently stored in the second communication device whereas the user individual information is stored in a separate memory area only as long as the same user is using the rental car and the second communication device thereof.

In case the second communication device is built in a vehicle used by a group of people, like a family the members of which share the vehicle or like the members of company using alternately the same company vehicle it is of advantage if the individual information from another first communication device is stored in the second communication device separately from other individual information of other first communication devices when the another first communication device is connected first to the second communication device.

To ensure that the individual information stored in the first communication device is the same as that stored in the second communication device at any time the devices are connected with each other, changes of the individual information related with the first communication device are stored in both the first and the second communication devices as long as the first and the second communication devices are connected to each other by the data link.

According to a further aspect of the present invention a method for operating any kind communication system including at least one communications device, comprises the steps of:—providing at least two logical communication devices in the communication device,—assigning the communication device to one of the at least two logical communication devices, and—storing individual information related to the communication device assigned to the one of the at least two logical communication devices to enable a personalized multi-user usage of the communication device. Thus, each user can input first and choose thereafter his/her personal telephone data (settings, phonebook entries etc.) without the need of reconfiguring the communication device (telephone) after it has been used by another user with other individual settings and the like. Consequently, it is possible to adapt the communication device (telephone) again to preferred settings or the way the user is used to use his/her telephone simply by selecting the respective individual information stored with regard to the respective logical communication device.

According to a preferred embodiment of the present invention, a first communication device is connected to the second communication device assigned to one of the logical communication devices therein via a data link for information transfer, individual information of the first communication device is transferred to the second communication device as individual information related to the latter one, and the transferred individual information from the first communication device is stored in the second information device for being used therein together with the assigned logical communication device. Thus, each user who owns a suitable mobile telephone is able to input his/her personal telephone data (SIM, settings phonebook etc.) stored in the mobile telephone via the data link so that these data is made available in second communication device in a convenient way.

For operating a communication system comprising first and second communication devices each capable of communicating with the telecommunications network, and both being connectable to each other by a data link for information transfer, the present invention provides a method wherein the logical communication devices are provided in the second communication device, wherein a first communication device connected to the second communication device via the data link is assigned to one of the logical communication devices, and wherein individual information of the first communication device is transferred to the second communication device when the first and the second communication devices are connected to each other by the data link for being used in the second communication device together with the logical communication device assigned to the first communication device.

Therefore, the owner of a mobile telephone can use a second communication device in the same manner as his/her own mobile telephone wherein the second communication device adopts the identity of the first one. This is of advantage because the user can always be called by other people using the phone number of his/her first communication device.

According to a preferred embodiment of the present invention, the information transfer is performed in response to a respective request input by the user.

Another embodiment of the present invention is characterized by keeping the connection between the first and the second communication devices active, if the second communication device, that is connected to the telecommunications network using the identity of the first communication device, is made passive to enter a stand-by mode in which the connection to the telecommunications network is interrupted, wherein entering the stand-by mode is preferably performed by actuating a specific input means. This makes sure that both radio parts can be reliably switched off simultaneously if necessary.

Another embodiment of the present invention is characterized by forwarding data that are received by the second communication device from the telecommunications network to the first communication device via the data link, if the second communication device is connected to the telecommunications network using the identity of the first communication device, wherein forwarding data from the second communication device to the first communication device is indicated to a user by the second communication device. In this way, data received by the second communication device is always made available for the user in her/his first communication device. Forwarding data in any case, i.e. even if data was already presented or if data could not be processed or handled by the second communication device, improves the reliability of data reception and prevents particularly data loss in case the second communication device includes less functionality than the first one.

BRIEF DESCRIPTION OF THE DRAWINGS

The present invention will be exemplarily described in more detail in connection with the embodiment shown in the drawings. Wherein.

DETAILED DESCRIPTION OF PREFERRED EMBODIMENTS OF THE INVENTION

Figure 1:
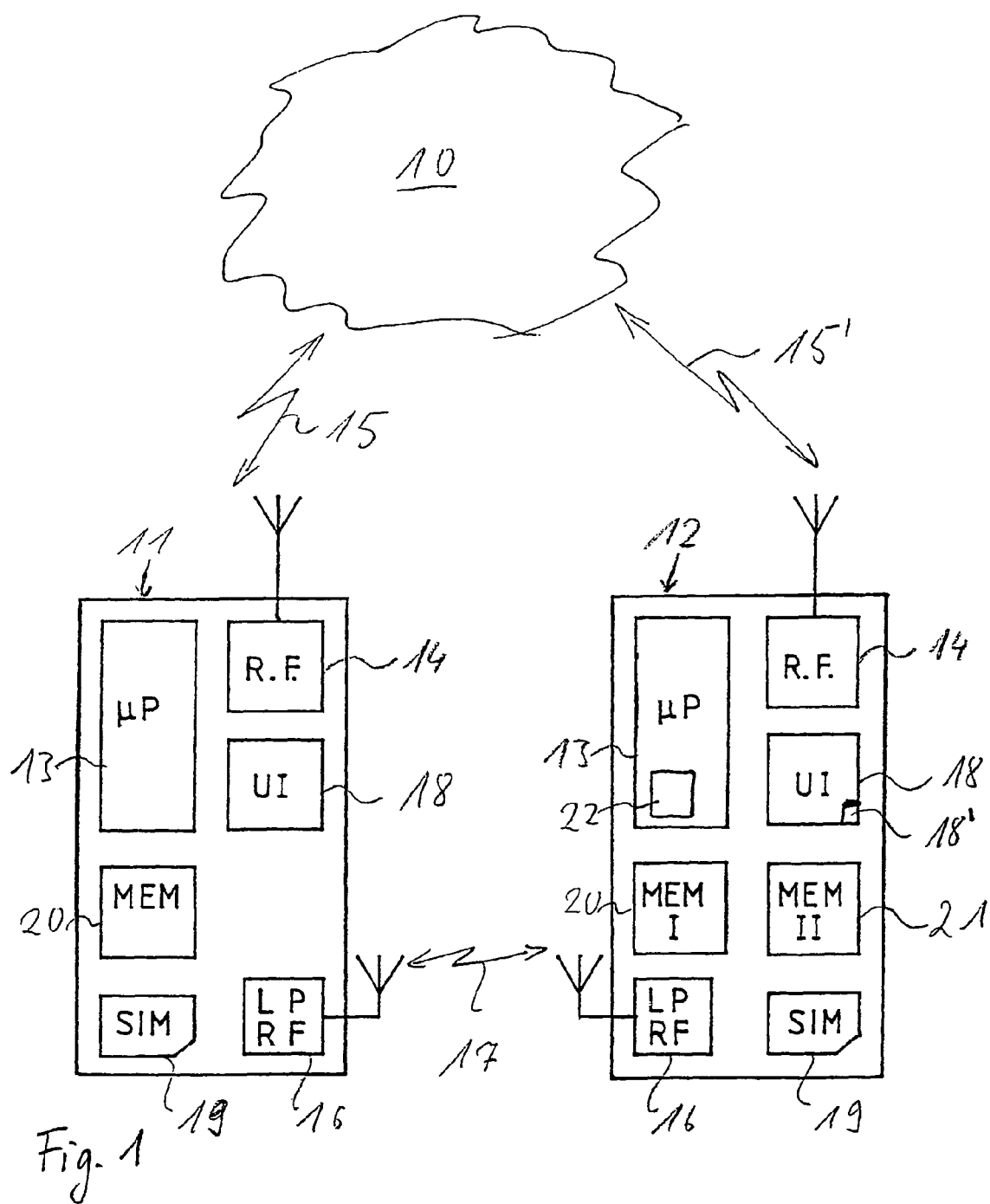
FIG. 1 shows a schematic block diagram of a communication system according to the invention.

As shown in FIG. 1 the communication system according to the present invention comprises first and second communication devices 11, 12 each of which is capable of communicating with a telecommunications network 10.

Each of the first and second communication devices 11, 12 comprises a control unit 13, e.g. a microprocessor μP, a radio frequency R.F. part 14 for establishing a radio link 15, 15' for communicating with the telecommunications network 10, a low power radio frequency LPRF part 16 for establishing a data link 17 connecting the first and the second communication device, and a user interface 18. The user interface (UI) 18 of each communication device comprises input means for inputting user commands, e.g. the keypad, a turn-push button, a jog dial, a specific control bottom 18', an on/off-switch, voice recognition means and the like, and output means, like a display and a loudspeaker.

Further, the first communication device 11 is provided with a subscriber identification module SIM, e.g. a SIM card 19 or any other identification means suitable for identifying a specific communication device as that of a specific subscriber, like a number assignment module NAM. The first communication device 11 further comprises a memory for storing user data like telephone book entries, contact cards, calendar information, SMS (short message service) massages or information, voice text, notes and the like. This memory can be part of a SIM card 19 and/or a memory 20 provided separately from the SIM card 19 in the communication device 11.

The second communication device usually includes a SIM card 19 and a memory 20 (MEM I) like the first communication device. However, using the features of the remote SIM access profile the second communication device 12 does not necessarily needs its own subscriber identification module since it can use the subscriber identification information of a first communication device 11 when such a device is connected to the second communication device 12 via the data link 17 so that the second communication device 12 can obtain SIM information to establish a radio communication link 15' with the telecommunications network 10 and adopt the identity of the first communication device 11.

Furthermore, according to the present invention the second communication device 12 comprises a special memory area (MEM II) 21 for storing individual information acquired from the first communication device 11 as well as a specific comparator means 22 that can be included in the microprocessor of the control unit 13, e.g. as a specific application unit.

According to a first embodiment of the present invention, the special memory area 21 is a specific area for storing individual information or user data from one first communication device 11 wherein the information and/or data stored in the special memory area 21 is only accessible as long as the respective first communication device 11 is connected to the second communication device 12 via the data link 17. As soon as the data link 17 is interrupted any access to the information stored in the special memory area 21 is prevented.

If another first communication device 11 is connected for the first time, the special memory area 21 is erased and new individual information acquired from the new first communication device 11 is stored in this special memory area 21.

According to another embodiment of the present invention, the special memory area 21 comprises at least two separate portions for storing individual information so that different portions of the special memory area 21 can be used for different first communication devices 11.

For describing the operation of the inventive communication system, it is assumed that the first communication device 11 is a portable radiotelephone or mobile phone whereas the second communication device 12 is a radiotelephone or car phone fixed in a vehicle. However, the inventive communication system is not limited to such a scenario but includes all cases where a second communication device 12 that can be more conveniently used by a user than the first communication device 11 is available. For example, in case that a user owns two communication devices one of which is convenient to be carried around whereas the other is more convenient to be used in the user's office she/he can always use the user identification of his/her first communication device (e.g. a very small mobile phone) even if he/she uses her/his second communication device (e.g. a Nokia communicator) by using the subscriber identification of the first communication device with the second one.

Further, in the following description contact data is used as example. There are many other possible data that can be handled in the same way. If a user having a mobile phone as the first communication device 11 enters a car in which a car phone is installed that is configured to be connected to another communication device via a data link 17 in the same way as the mobile phone of the user, then the first and the second communication devices 11, 12, i.e. the mobile phone and the car phone are connected to each other by the data link 17.

If this connection between both devices is established for the first tim; contact data contained in the mobile phone are copied from the mobile phone to the car phone and are stored in the special memory area 21. The data in this special memory area 21 are only available as long as the mobile phone from which the data originates is connected to the car phone.

As long as the mobile phone is connected to the car phone the user can now opt to use the contact data of the mobile phone stored in the specific memory area 21 or the contact data of the car phone stored in the corresponding memory area 20 thereof. It is important that only one data memory at a time is selected by the user. This can be a menu selection in the car phone user interface, for example. The active data store selection is important because it has a special meaning when the specific memory area 21 is active. In this case all changes of contact data will be synchronized between the memories 21,20 of the communication devices 11,12, i.e. the mobile phone and the car phone, continuously. Thus, if a contact is added using the car phone user interface 18 the resulting contact will be stored in the specific memory area 21 and will then be copied automatically to the memory 20 of the mobile phone.

If the user leaves the car with his/her mobile phone the data link 17 will be terminated. Consequently, the data in the specific memory area 21 of the car phone is no longer usable, but these data are not erased. In particular, it has to be pointed out that the data in the special memory area 21 cannot be used as long as the communication device 11 from which the data originates is not connected to the second communication device 12, i.e. to the car phone.

If the same mobile phone is connected again to the car phone via the data link 17 using the respective LPRF parts 16 the comparator means 22 of the control unit 13 compares the data stored in the special memory area 21 of the car phone with the data stored in the mobile phone to check whether or not the same information is stored in both memories 20, 21. If there are some changes of the information stored in the mobile phone only these changes are copied to the special memory area 21 of the car phone. Thus, instead of copying all contact data from the mobile phone to the car phone these data are only synchronized so that the data memories are consistent thereafter. After the synchronization the operation continues as described above.

If another user enters the car with another mobile phone that can be connected to the car phone via a data link 17 the microprocessor or control unit 13 of the car phone recognizes that the mobile phone connected to the car phone is connected for the first time. Therefore, according to a first embodiment of the present invention the contact data of the new mobile phone is copied to the specific memory area 21 of the car phone so that the contact information originated from the former mobile phone is erased and replaced by that of the new one.

According to another embodiment of the present invention a specific part of the special memory area is assigned to the new mobile phone so that contact information can be stored in another part of the specific memory area 21 without erasing the contact information formally stored.

In this case also it is not possible to use contact data of a mobile phone that is not connected to the car phone.

Synchronization of data to make the data of a mobile phone stored in the mobile phone and the car phone consistent is performed in the same way as described above.

According to another embodiment of the present invention, the second communication device is enabled to assign first physical communication devices 11 or SIM cards 19 to respective logical communication devices provided in the second communication device 12. In particular, the logical communication devices are stored in a special memory area of the second communication device, e.g. in the special memory area 21, and include all data related with the communication device, e.g. telephone related data like user settings, telephone books, etc. In this way it is possible to provide a personalized multi user usage of a single radio telephone.

When a first communication device 11, e.g. a mobile telephone, is connected to a second communication device 12, e.g. a car telephone, via the data link 17, the mobile telephone will be assigned to one of the logical communication devices within the second communication device 12, i.e. within the car telephone. Then, the corresponding telephone data of the mobile telephone, e.g. user settings and phone book entries, are transferred via the data link either automatically or in response to a corresponding command input by the user, to the second communication device 12, i.e. to the car telephone to provide the user of the car telephone with all telephone related data known from his/her own mobile telephone.

In addition, it is also possible to assign one and the same first communication device 11 or one and the same SIM card 19 provided in the first or the second communication devices 11, 12 to different logical communication devices. Thus, it is possible to share a specific first communication device 11 or a mobile telephone or the local SIM card provided in the second communication device 12, i.e. in the car telephone by several users with different user settings and phone books, so that each user can select his/her own settings.

In case that the first communication device is a mobile telephone and the second communication device 12 is a car telephone as assumed above, the invention allows the seamless usage of the car telephone by a plurality of users who have different mobile telephones and/or different telephone data or preferred telephone settings. Each user can be provided with her/his personal phone data, e.g. SIM card, telephone settings, phone book etc., without the need of switching SIM cards manually or of reconfiguring the car telephone to adapt it to her/his preferred telephone settings or the way she/he is used to use her/his mobile telephone.

In case a mobile telephone 11 is connected for the first time to the car telephone either automatically or upon user request via the data link, all mobile telephone 11 related data are transferred to the car telephone. In the car telephone the mobile telephone related data are assigned to a specific logical telephone provided within the car telephone. Thereafter, the respective logical telephone can be automatically selected for further operating the car telephone so that the user of the mobile telephone can use the car telephone in just the same way as her/his mobile telephone.

If the mobile telephone is connected again to the car telephone the corresponding logical telephone that includes all mobile telephone related data can be selected automatically or upon user request.

In case another mobile telephone of another user connected for the first time with the car telephone is another mobile telephone, it is assigned to another logical telephone within the car telephone. In this case the operation of the system is just the same as above.

However, it is also possible to prompt the user upon connecting a new mobile telephone to the car telephone to decide which logical telephone should be used with the new mobile telephone, i.e., a specific logical telephone with a given or new setting or another (new) logical telephone with no or default settings. If another logical telephone should be used individual data, in particular telephone settings can be either retrieved from the new mobile phone or input by the user.

Furthermore, the local SIM card 19 of the car telephone 12 may be assigned to different logical telephones provided within the car telephone 12 so that different users of the car telephone can use the car telephone in a different manner without the need of having a mobile telephone available. In this case the telephone settings, telephone book entries have to be input via the user interface 18 of the second communication device. However, it is also possible to use the local SIM card 19 of the car telephone 12, but to input individual information, i.e. telephone settings, contact data, etc. via a data link 17 established between the car telephone and a mobile telephone 11 so that individual information provided in the mobile telephone 11 can be easily transferred to the car phone and can be used there together with the local SIM card 19.

Upon switching on, the car telephone enters the operating state of the last operating period. If the car telephone was operated by a user A using the local SIM card 19 and settings A stored in the car telephone only (i.e. local set-tings), the car telephone enters the same state using the local SIM card 19 and settings A again and preferably prompts the user to confirm the selected operating state or to choose another one. If the local SIM card 19 was used the last time together with settings provided by a mobile telephone so that these settings are only accessible if the mobile telephone is connected via the data link 17 (remote settings, i.e. settings that may be stored in the car telephone or not, but be accessible only as long as the mobile telephone they are from is connected to the car the telephone), the car telephone tries to enter the corresponding operating state again. If in this case the corresponding mobile telephone is accessible via the data link 17 the operating state is regarded as confirmed. However, if the mobile telephone is not available the user is prompted to choose a suitable operating state, i.e. suitable settings. If the car telephone was used the last time with a remote SIM card 19 the car telephone 12 tries to get access to the respective SIM card 19. If the connection is built up successfully the car telephone operates with the identity according to the respective SIM card 19. Otherwise, the use is prompted to choose a suitable state.

In any case, i.e. using the local SIM card 19 with local settings or with remote settings or using a remote SIM card 19, telephone settings can be input or modified by the user via the user interface 18 of the car telephone.

According to another embodiment of the present invention, the second communication device 12, e.g. a car phone is provided with a specific stand-by mode that can be selected either by a manual selection using the menu of the user interface 18 or by a specific stand-by mode button 18' being a special part of the user interface 18.

If the stand-by mode is selected the connection between the first and the second communication devices 11, 12, i.e. the data link 17 is kept active whereas the radio frequency part 14 of the second communication device 12 is switched off so that both radio frequency parts 14 of the first and the second communication devices 11,12 are simultaneously switched off. Thus, it is possible to deactivate the radio frequency parts 14 of both communication devices 11,12 whereas the data link 17 is active to prevent particularly the first communications device 11 to start establishing a radio link 15 to the telecommunications network 10 in regions near a patrol station or the like where it is not allowed to use telecommunication devices.

To prevent data loss in case that the second communication device 12 has less functionality than the first communication device 11, like e.g. does not support calendar or MMS (Multimedia Messaging Service) features, the second communication device 12 comprises a functionality that forwards data that are received from the telecommunications network 10 to the first communication device 11 via the data link 17 in case that the second communications device 12 is connected to a first one and uses the identity of the first communications device 11. This way the user has always all received data on her/his first communication device. This feature is especially of importance if the second communication device cannot display or process the received data.

In this case it is preferred that it is indicated to the user that certain data was received by the second communication device 12 and forwarded to the first one so that the user is informed immediately and can choose whether or not she/he will have access to these data by disconnecting the first communication device 11 from the second one.

In this way data loss can be reliably prevented and the user will see received information or data in the same inbox as it would have received the information directly over the telecommunications network 10. Thereafter, normal processing and/or handling of the received data can be done in the usual way.

The invention claimed is:

1. A communication device for the use in a communication system comprising said communication device as a second communication device of said communication system, said communication system also comprising a first communication device,
   wherein
   said first communication device is capable of communicating with a telecommunications network,
   the first communication device contains individual information, and
   said first and second communication devices both being connectable to each other by a data link for information transfer,
   said second communication device configured to communicate with said telecommunications network, and
   the second communication device comprises
      a special memory area configured to store individual information acquired from the first communication device as well a comparator configured to compare the individual information contained in the first communication device with that stored in the special memory area of the second communication device,
   the special memory area comprises at least two separate portions configured to store individual information of different first communication devices separately.

2. The communication device according to claim 1, configured to:
   provide at least two logical communication devices in the communication device, assign the communication device to one of the at least two logical communication devices, and
   store individual information related to the communication device assigned to the one of the at least two logical communication devices to enable a personalized multi-user usage of the communication device.

3. The communication device according to claim 2, configured to:
- connect a first communication device to the second communication device assigned to one of the logical communication devices therein via a data link for information transfer, transfer individual information of the first communication device to the second communication device as individual information related to the latter one, and
- store the transferred individual information from the first communication device in the second information device for being used therein together with the assigned logical communication device.

4. The communication device according to claim 3, wherein the information transfer is performed in response to a respective request input by the user.

5. The communication device according to claim 2, wherein
- the logical communication devices are provided in the second communication device,
- a first communication device connected to the second communication device via the data link is assigned to one of the logical communication devices, and
- individual information of the first communication device is transferred to the second communication device when the first and the second communication devices are connected to each other by the data link for being used in the second communication device together with the logical communication device assigned to the first communication device.

6. The communication device according to claim 1, wherein the second communication device is connectable to the telecommunications network using the identity of the first communication device when the first and the second communication devices are connected to each other by the data link, and is configured to:
- keep the connection between the first and the second communication devices active, if the second communication device, that is connected to the telecommunications network using the identity of the first communication device, is made passive to enter a stand-by mode in which the connection to the telecommunications network is interrupted.

7. The communication device according to claim 6, wherein entering the stand-by mode is performed by actuating a specific input means.

8. The communication device according to claim 1, wherein the second communication device is connectable to the telecommunications network using the identity of the first communication device when the first and the second communication devices are connected to each other by the data link, and is configured to:
- forward data that are received by the second communication device from the telecommunications network to the first communication device via the data link, if the second communication device is connected to the telecommunications network using the identity of the first communication device.

9. The communication device according to claim 8, wherein said data forwarded from the second communication device to the first communication device is indicated to a user by the second communication device.

10. A method comprising:
- operating a second communication device in a system comprising a first communication device and the second communication device, both the first communication device and the second communication device capable of communicating with a communications network, and both connectable to each other by a date link for information transfer,
- said second communication device storing individual information acquired from the first communication device in the second communication device so that the individual information from the first communication device is directly accessible by the second communication device when the first and the second communication devices are connected to each other by the data link at a very first time, or
- the second communication device comparing the individual information from the first communication device stored in the second communication device with the individual information in the first communication device when the first communication device is connected again to the second communication device, and
- the second communication device storing only changes of the individual information of the first communication device in the second communication device.

11. An apparatus, comprising:
- at least one processor; and
- at least one memory including computer program code, the at least one memory and the computer program code configured to, with the processor, cause the apparatus to operate in a communications system comprising the apparatus and a communication device, the apparatus and the communication device each capable of communicating with a telecommunications network, and both connectable to each other by a data link for information transfer, the memory and the computer program code further configured to, with the processor, cause the apparatus to:
  - store individual information from a communication device in the memory so that the individual information from the communication device is directly accessible by the apparatus when the apparatus and the communication device are connected to each other by a data link at a very first time, or
  - compare the individual information from the communication device stored in the memory with the individual information in the communication device when the communication device is connected again to the apparatus, and
  - store only changes of the individual information of the communication device in the memory.

12. The apparatus according to claim 11, wherein an access to the individual information from the communication device stored in the memory is prevented when the apparatus and the communication device are disconnected.

13. The apparatus according to claim 11, wherein
- the individual information from the communication device stored in the memory is replaced by individual information of another communication device when the another communication device is connected first to the apparatus.

14. The apparatus according to claim 11, wherein
- individual information from another communication device is stored in the memory separately from other individual information of other communication device when the another communication device is connected first to the apparatus.

15. The apparatus according to claim 11, wherein the changes of the individual information related with the communication device are stored in both the communication device and the memory as long as the communication device and the apparatus are connected to each other by the data link.

* * * * *

UNITED STATES PATENT AND TRADEMARK OFFICE
CERTIFICATE OF CORRECTION

| | | |
|---|---|---|
| PATENT NO. | : 7,957,729 B2 | Page 1 of 1 |
| APPLICATION NO. | : 10/540441 | |
| DATED | : June 7, 2011 | |
| INVENTOR(S) | : Martin Roter et al. | |

It is certified that error appears in the above-identified patent and that said Letters Patent is hereby corrected as shown below:

On the front page under "FOREIGN PATENT DOCUMENTS" at line 4, GB 101 00 824 7/2002" should be --DE 101 00 824  7/2002--.

Signed and Sealed this
Thirtieth Day of August, 2011

David J. Kappos
*Director of the United States Patent and Trademark Office*